Dec. 25, 1923.  
A. B. KLAY  
1,478,964  
BEARING AND GEAR REMOVING TOOL  
Filed June 15, 1921  
2 Sheets-Sheet 1
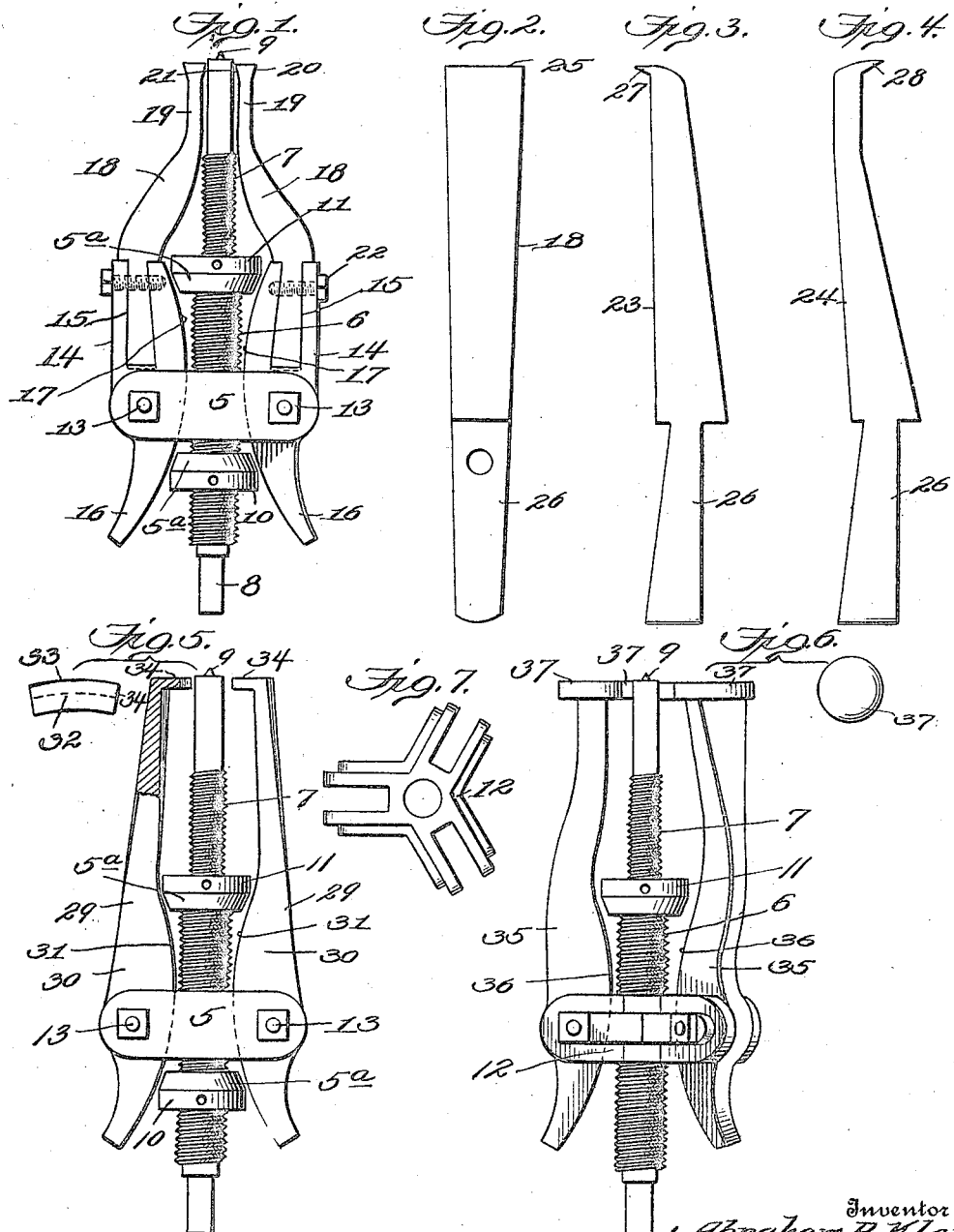

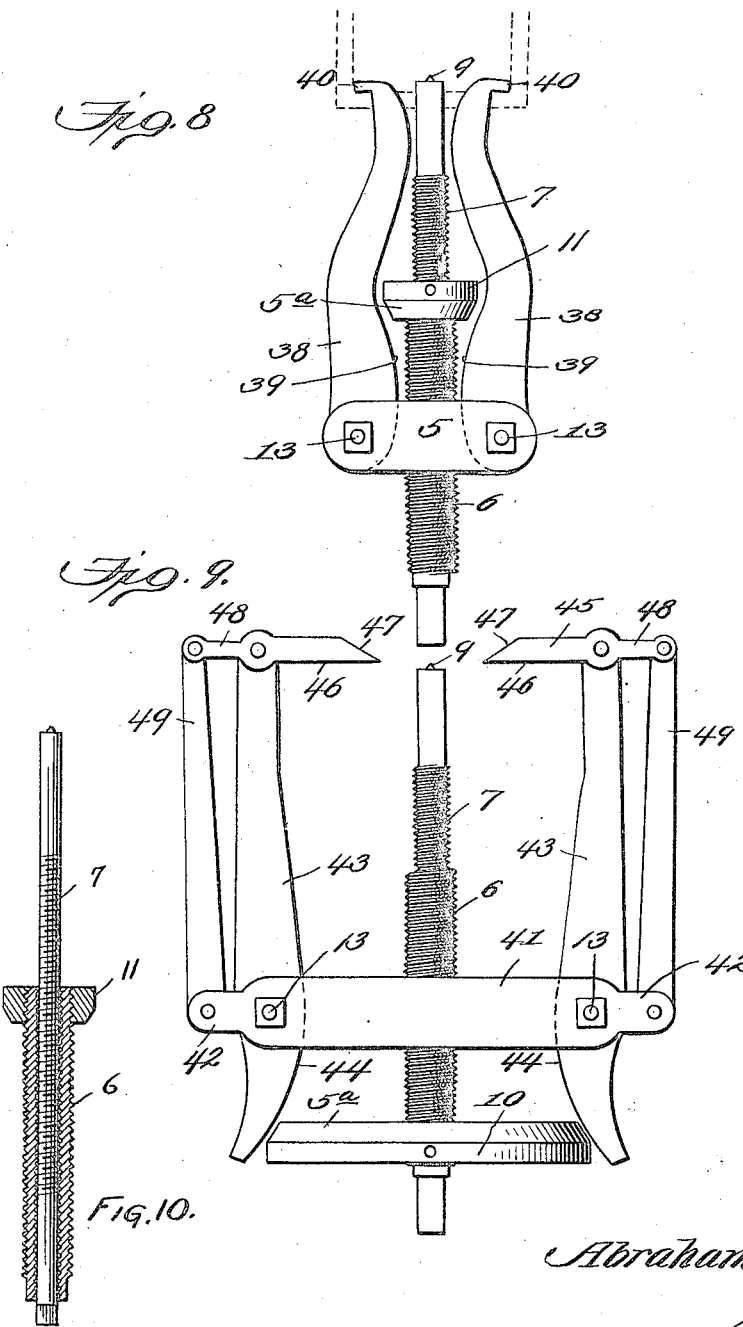

Patented Dec. 25, 1923.

1,478,964

UNITED STATES PATENT OFFICE.

ABRAHAM B. KLAY, OF MODESTO, CALIFORNIA; JOHN J. KLAY EXECUTOR OF SAID ABRAHAM B. KLAY, DECEASED.

BEARING AND GEAR REMOVING TOOL.

Application filed June 15, 1921.   Serial No. 477,821.

*To all whom it may concern:*

Be it known that I, ABRAHAM B. KLAY, a citizen of the United States, residing at Modesto, in the county of Stanislaus and State of California, have invented new and useful Improvements in Bearing and Gear Removing Tools, of which the following is a specification.

This invention relates to tools or implements for removing ball and roller bearings and for pulling gears of certain types in various classes of mechanism, and the primary object of the same is to provide means for conveniently displacing and removing ball and roller bearings as well as gears without injury to the parts of the latter and without requiring displacement of other mechanisms to accomplish the removal of the devices mentioned and replacement of the same for the purposes of adjustment or repair. A further object of the invention is to provide a tool or implement of the class specified which may be readily and expeditiously applied and maintained positively in gripping position while the pressure applying implement is operated without injury to the bearings or the gear engaged thereby.

The improved implement in certain of its organizations comprises a yoke adapted to hold two or more tool members and replaceable by other tool members to adapt the implement as a whole for use in performing various kinds of work, and essentially comprises a screw-threaded sleeve extending through the tool member holding yoke and provided with opposed nuts which have a contracting and expanding function relatively to the tool members and one or both of which may be used in accordance with the character of the tool member held by the yoke and the work to be performed, a pressure applying element being operable through the said sleeve to effect the displacement of the bearing or gear engaged by the tool members.

The invention also consists in the construction and arrangement of the several parts which will be more fully hereinafter described and claimed.

In the drawings:

Fig. 1 is an elevation of a tool or implement embodying the features of the invention and having tool members therein for removing a ball-bearing;

Fig. 2 is a detail side elevation of one of the tool members shown by Fig. 1;

Figs. 3 and 4 are detail elevations of tool members adapted to be substituted for the members shown by Fig. 1;

Fig. 5 is a detail elevation of the tool or implement shown equipped with tool members for pulling a gear, one of the tool members being partially broken away and illustrated in section;

Fig. 6 is a detail elevation of the improved tool members showing a yoke having three arms for supporting gear-pulling tool members of a different structure;

Fig. 7 is a top plan view of the form of yoke used in the tool or implement shown by Fig. 6;

Fig. 8 is a detail elevation showing the implement provided with a two-arm yoke and a further form of tool members for working outwardly or expanding in performing their pulling function, the tool members being shown in engagement with a portion of a bearing illustrated in dotted lines.

Fig. 9 is a detail elevation of a modified form of yoke and tool members and particularly illustrating pulling terminals which are constantly maintained in straight positions irrespective of the adjustment of the main bodies of the members.

Fig. 10 is a detail sectional view, showing an internally and externally screw-threaded sleeve and a screw-threaded rod comprising the essential features of all the forms of the present invention.

The numeral 5 designates a yoke having a threaded sleeve 6 secured thereto and a pressure or drawing rod 7 movable through the sleeve and having one end 8 shaped for application thereto of a wrench or other device, the opposite end of said rod being provided with a center point 9 to engage the usual center recess in the end of a shaft. The pressure or drawing rod 7 has exterior screw threads to cooperate with similar threads in the bore of the sleeve 6. On the sleeve 6 outer and inner adjusting nuts 10 and 11 are mounted to operate at opposite sides of the yoke, these nuts being each provided with reversely arranged beveled faces 5ª for a purpose which will be presently explained. The yoke as shown by Figs. 1, 5, 8 and 9 has two arms, but as shown by Figs. 6 and 7 a yoke 12 may be used having three arms, and it will be understood that it is proposed to use a yoke having two or more arms in accordance with the requirement of the particular use or application of the improved tool. The parts of the improved tool or implement thus far described are common to all of the forms of the tool shown and constitute the basic organization of the same, and in some instances, as hereinafter explained, the nut 11 will be used alone, or the nut 10 may serve to operate with the tool members or tool-holding devices associated with the several yokes without the services of the nut 11. It will therefore be understood that the sleeve 6 may be equipped with one or two nuts, and at any time desired, one of these nuts may be removed and reapplied as may be found necessary in various applications and uses of the improved tool or implement. The threaded sleeve 6 has portions thereof projecting both in advance and in rear of the yoke in each form of the construction shown and which will be more fully hereinafter referred to. The purpose of this particular arrangement of the screw-threaded sleeve is to provide for application thereto of a nut or adjusting means, either in advance of or in rear of the yoke, or to have two nuts on each sleeve, as will be explained in connection with modifications of the improved device. This structural provision or extension of the threaded sleeve in advance and in rear of the yoke is materially advantageous from a standpoint of manufacture, as one form of sleeve is rendered applicable to all forms of the improved device, and moreover, the use of one or two adjusting nuts or devices on the sleeve is permissible in accordance with the character of the adjustment that may be required to adapt the improved tool in its different forms to various applications and operations.

In the form of the implement shown by Figs. 1, 5 and 8 the yoke 5 has suitable openings in the outer extremities of the arms to receive movable bolts and nuts 13 which extend transversely therethrough, the arms of the yoke being bifurcated similar to the three arms shown in the form of the yoke illustrated by Fig. 7. Either tool carriers or the tools themselves may be connected to the opposite extremities of the arms in such manner as to fulcrum on the bolts which engage with the carriers or tool members, so that the tool members may be operated through the adjustments of the nuts 10 and 11 to expand or contract in accordance with the particular nut operated. In Fig. 1 the yoke 5 has a carrier 14 movably connected to the extremity of each arm thereof, and said carrier is formed with an inner socket 15 and an outer operating extension 16, the inner edge of the carrier from the rear reduced end of the extension fully to the front terminal of the carrier being formed with a regularly curved convex edge 17 adapted to be engaged by the beveled faces $5^a$ of the nuts 10 and 11. By adjusting the nut 10 forwardly over the sleeve 6, the beveled faces $5^a$ thereof engage the inner convex edge 7 of the extensions 16 and force the said extensions outwardly, and as a consequence, draws the tool members mounted in the carriers inwardly. The tool members 18 shown by Figs. 1 and 2 are particularly adapted for pulling or drawing the ball-bearing and these tool members have rear reduced bearing-engaging arms 19 with the ends slightly enlarged or given a practical wedge-shape by means of outward and inward bevels 20 and 21 which may be either straight or curved as desired. The tool members 18 are removably held in the sockets 15 of the carriers 14 by screws 22, so that the said tool members 18 may be replaced by other tool members of a different shape, as for instance the tool members 23 and 24 shown by Figs. 3 and 4. Each tool member 18 is of the general shape as shown by Fig. 2, and the outer end 25 which is provided with the opposed bevels 20 and 21 is broad enough to give ample purchase on or engage with the part of the bearing with which it is adapted to operate. Each tool member 18, 23 or 24 has a shank 26 of such shape as to fit in the socket 15 and is preferably diverged towards its rear end so as to be held against longitudinal displacement when engaged with its carrier during the drawing operation of the tool or implement. The tool members shown by Figs. 23 and 24 are of similar construction, with the exception that the tool member 23 has an inwardly projecting beak or hook 27 at its forward working end, and the tool member 24 has an outwardly projecting beak or hook 28. The tool members 23 and 24 may readily replace the tool members 18 or be fitted in the carriers 14. The tool members 18, 23 and 24 are intended to operate in engagement with bearings, either of the ball or roller type.

Fig. 5 illustrates a tool or implement organization particularly adapted for pulling gears, but may be used for other purposes to which it is applicable. In the structure shown by Fig. 5 the basic elements, or the yoke 5, sleeve 6, pressure or drawing rod 7 and nuts 10 and 11 are illustrated and have the same function as in the structure shown by Fig. 1. The carriers 14 shown by Fig. 1 are omitted and unnecessary in the structure shown by Fig. 5, in view of the fact that the tool members 29 in Fig. 5 directly pivoted in the yoke arms replace the said carriers. The tool members 29 have their outer portions 30 so shaped that they will give sufficient bearing strength to the members 29 when engaged by the bolts and nuts 13, and the inner edges 31 of the said tool members are regularly curved or given a convex contour as shown for engagement by the beveled face 5ª of the nut, this latter nut being the only one of the two nuts used in this construction. The forward extremities of the tool members 29 have a concavo-convex form, as shown in top plan view at the left of Fig. 5 and indicated by the numerals 32 and 33. The free extremities of the said tool members 29 are also formed with inwardly extending gripping jaws 34, to adapt this tool organization for engaging over and closely bearing against the inner side of a gear or an analogous machine element. The nut 11 remains inactive, as above noted, the nut 10 being adjusted rearwardly on the sleeve 6 to cause the beveled face 5ª thereof to bear against the inner opposed convex edges 31 of the members 30, to thereby hold the forward jaws 34 inwardly against outward movement, and by thus fixing the adjustment of the jaws and the tool members 29 as a whole a positive gripping engagement of the tool members relatively to a gear or other machine element will ensue. It will be understood that the jaws 34 will be held in such relative spaced relation with constancy and may be regulated by shifting the nut 10 inwardly or outwardly on the sleeve 6.

The tool or implement organization shown by Figs. 6 and 7 is also adapted for pulling gears, and as hereinbefore described, the yoke 12 in this structure has three arms in which tool members 35 are directly pivoted as shown and have inner convex edges 36 with which the nut 11 co-operates, the nut 10 being removed in this form of the tool organization in view of the fact that it is desired that the tool members 35 be held in expanded relation when applied to the gears. The inner working ends of the tool members 35 are preferably of circular form or shaped as circular heads 37 of greater diameter than the dimensions of the adjacent extremities of the tool members connecting therewith. The dimension of the heads 37 is such as to permit them to be readily inserted through the openings in standard makes of gears, and after the heads have been so applied they may be expanded by means of the nut 11 to cause the outer portions thereof to firmly engage against the gear side adjacent to the openings and effect an equal pull from three points. In some instances the nut 11 may remain inactive and the nut 10 applied to the sleeve 6 and adjusted to cooperate with the inner convex edges 36 of the tool members 35 to contract the inner extremities and the heads 37 so that the inner parts of the latter heads may be positively fixed against the rear side of the gear to be pulled.

The tool or implement organization shown by Fig. 8 has been devised for use with a gear or wheel-like machine element having spokes, or where the inner part of the rim of such gear or element is accessible, and in this form of the tool or implement the same basic elements are used as hereinbefore described, including the yoke 5 having a pair of arms in which tool members 38 are pivotally connected at their outer ends by the bolts and nuts 13. The nut 11 is used alone in this form of the tool or implement and the beveled face 5ª of the latter is adapted to engage the inner convex edges 39 of the tool members 38. The inner extremities of the tool members 38 have outwardly projecting substantially straight hooks or beaks 40 to bear against or grip the rear side of a gear rim, and these engaging extremities of the said tool members 38 are so shaped as to give them an advantageous bearing contour relatively to the gear or other like machine elements with which the inner extremities of the tool members are brought into operative relation. It will be seen that when the nut 11 is adjusted to engage the inner convex edges 39 of the tool members 38 the latter will be held expanded and in non-slipping engagement with the gear or element to which they have been applied.

Fig. 9 illustrates another form of ball or roller bearing pulling or drawing organization embodying the essential features of the invention. This form of the tool or implement has been particularly constructed to operate with bearings having outer and inner rings which are adapted to be uniformly or simultaneously and equally displaced or drawn. In this form of the tool or implement the sleeve 6, nut 10 and pressure or drawing rod 7 of the form heretofore described are used, the nut 10 being of slightly greater dimensions than the similar nuts heretofore described, but having the same beveled contact face 5ª as in the previous similar structures. The yoke 41 in this instance is essentially the same as the yokes 5 heretofore described, but in addition is supplied with end lugs 42, the lugs and yoke ends being bifurcated for movable application thereto of main tool members 43 having inner convex edges 44 for engagement by the beveled face 5ª of the nut 10. To the inner ends of the tool members 43 bearing engaging arms 45 are pivotally connected and have inner straight edges 46 and beveled inner ends 47. The arms 45 also have outward extensions 48 to which the inner ends of links 49 are pivotally connected, said links being also fulcrumed at their outer ends in the lugs 42. The object of this construction is to maintain the bearing engaging arms 45 always in transverse straight alinement, so as to bring the outer edges 46 of these arms with uniform pressure contact against the outer and inner rings of the class of bearings for which this form of the tool or implement is adapted. No matter how the tool members 43 may be adjusted by the nut 10, the arms 46 will always be maintained in the form shown, or positioned in transverse straight alinement through the medium of the links 49, and thereby the outer and inner rings of the bearings will be regularly drawn or pulled. The reduction of the inner ends of the arms 45 provided by the levels 47 permit these arms to be inserted between closely associated parts.

From the foregoing it will be seen that the improved tool or implement is adapted for practical service in drawing or pulling various types of bearings and gears, and also that the parts of the tool members may be interchanged. In the operation of all of the forms of the improved device the pressure or drawing rod 7 will be set against the end of a shaft or analogous device after the inner extremities of the tool members have been adjusted or applied to the bearing or gear device to be removed from the shaft or like device, and by rotating the said pressure rod in the proper direction the removal of the bearing or gear will be effected.

It will also be understood from the foregoing disclosure that the tool members may be interchangeably held by carriers pivotally mounted on the yoke of each tool or implement, or be directly applied to the several yokes, the use of the carriers 14 permitting the employment of a lower grade of metal at a more economical cost of production as a holding or connecting means for the tool members, as it will be necessary to make the tool members of a better and more expensive grade of metal. In addition to the several applications of the improved tool or device hereinbefore described, it is obvious that the same may be utilized for other purposes where found applicable, and that variations in the dimensions and general proportions as well as the details may be adopted without departing from the spirit of the invention and the scope of the appended claims.

What is claimed as new is:

1. A tool or implement for removing bearings or gears, comprising a yoke, an elongated interiorly and exteriorly screw-threaded sleeve secured to the yoke, portions of the sleeve projecting in advance and in rear of the yoke to adapt the tool to various adjusting devices to accommodate operation thereof when applied to different mechanical devices, a screw-threaded drawing rod movable through the sleeve, tool members adjustably held by the yoke and provided with portions extending in advance and in rear of the said yoke, the tool members having their inner ends formed for engagements with the bearings or gears, and means movably engaging the exterior threads of the sleeve for regulating the adjustment of the tool members independently of the adjustment of the screw-threaded drawing rod.

2. A tool member or implement for removing bearings or gears, comprising an elongated interiorly and exteriorly screw-threaded sleeve, a screw-threaded drawing rod movable through said sleeve, supporting means mounted on the sleeve, tool members pivotally held by the supporting means and adjustably mounted with relation to the sleeve, the tool members and the screw-threaded sleeve projecting in advance and in rear of the supporting means for variation of adjustment of the said member, and adjusting means movably mounted on the sleeve and adapted to engage the tool members to move the latter and vary the distance apart of the inner ends of said members.

3. A tool or implement of the class specified, comprising a screw-threaded sleeve, a drawing rod movable through the sleeve, tool members adjustably associated with the sleeve and having inner extremities constructed to engage a bearing or gear, and means movable longitudinally on the sleeve for adjusting the tool members to expand or contract the latter.

4. In a tool or implement of the class specified, a screw-threaded sleeve, a drawing rod movable through the sleeve, tool members pivotally associated with the sleeve and having a contracting or expanding adjustment, and opposed nuts on the sleeve individually adjustable to contract and expand the tool members.

5. In a tool element of the class specified, a screw-threaded sleeve, a yoke secured to an intermediate portion of the sleeve, a drawing rod movable through the sleeve, tool members pivotally associated with the yoke, and opposed nuts engaging the sleeve on opposite sides of the yoke and independently operable for contracting and expanding the tool members.

6. In a tool or implement of the class specified, a screw-threaded sleeve, a drawing rod movable through the sleeve, a yoke secured to an intermediate portion of the sleeve, carriers pivotally mounted in the outer extremities of the yoke, tool members separably mounted in the carriers, and opposed nut devices on the sleeve to engage the inner edges of the carriers for contracting and expanding the latter and the tool members.

7. In a tool of the class specified, a screw-threaded sleeve, a drawing rod movable through the sleeve, a yoke secured to the intermediate portion of the sleeve, carriers pivotally mounted in the outer extremities of the yoke and having inner convex edges, tools separably and replaceably mounted in the carriers, and opposed nuts on the sleeve to engage the convex edges of the carriers for contracting and expanding the latter and the tools.

8. In a tool or implement of the class specified, a screw-threaded sleeve, a drawing rod movable through the sleeve, bearing or gear pulling means movably supported in relation to the sleeve for contraction or expansion, and devices shiftably mounted on the sleeve and independently adjustable for contracting or expanding the bearings or gear pulling means.

In testimony whereof I have hereunto set my hand.

ABRAHAM B. KLAY.